(12) United States Patent
Molinaro

(10) Patent No.: US 10,563,791 B2
(45) Date of Patent: Feb. 18, 2020

(54) VALVE CONTROL DEVICE

(71) Applicant: 4MC, Sannois (FR)

(72) Inventor: Narciso Loris Molinaro, Montigny les Cormeilles (FR)

(73) Assignee: 4MC, Sannois (FR)

( * ) Notice: Subject to any disclaimer, the term of this patent is extended or adjusted under 35 U.S.C. 154(b) by 137 days.

(21) Appl. No.: 15/563,730

(22) PCT Filed: Apr. 3, 2015

(86) PCT No.: PCT/FR2015/050877
§ 371 (c)(1),
(2) Date: Oct. 2, 2017

(87) PCT Pub. No.: WO2016/156673
PCT Pub. Date: Oct. 6, 2016

(65) Prior Publication Data
US 2018/0080575 A1   Mar. 22, 2018

(51) Int. Cl.
| | | |
|---|---|---|
| F16K 31/53 | (2006.01) | |
| F15B 15/06 | (2006.01) | |
| F16K 31/54 | (2006.01) | |
| F16K 31/163 | (2006.01) | |
| F16H 19/04 | (2006.01) | |
| F15B 21/00 | (2006.01) | |

(52) U.S. Cl.
CPC ............ *F16K 31/54* (2013.01); *F15B 15/065* (2013.01); *F16H 19/04* (2013.01); *F16K 31/1635* (2013.01); *F15B 21/003* (2013.01); *F16K 31/535* (2013.01)

(58) Field of Classification Search
CPC ...... F15B 15/065; F15B 15/06; F15B 15/061; F16K 31/54; F16K 31/1635; F16K 31/53; F16K 31/535; F16H 19/04
USPC ...................... 251/250, 250.5, 248; 92/169.1
See application file for complete search history.

(56) References Cited

U.S. PATENT DOCUMENTS

| | | | |
|---|---|---|---|
| 305,084 A | 9/1884 | Lawson | |
| 4,535,814 A | 8/1985 | Pawelzik et al. | ........ 137/625.17 |
| 4,872,360 A * | 10/1989 | Lew | ........ F01B 9/047 |
| | | | 74/110 |
| 4,986,301 A | 1/1991 | Ziliani et al. | |

(Continued)

FOREIGN PATENT DOCUMENTS

| | | | |
|---|---|---|---|
| EP | 0 103 744 A1 | 3/1984 | ............. F16K 11/06 |
| EP | 0 387 205 A2 | 9/1990 | |

(Continued)

OTHER PUBLICATIONS

International Search Report from corresponding International Patent Application No. PCT/FR2015/050877, dated Nov. 27, 2015.

*Primary Examiner* — Kevin F Murphy
*Assistant Examiner* — Kelsey E Cary
(74) *Attorney, Agent, or Firm* — Kusner & Jaffe

(57) ABSTRACT

A device for actuating a valve by means of a rack meshing with an elliptical pinion connected with a sleeve so that one transmits a torque to the other. The connections between the pinion and the rack as well as the sleeve are separable, so that the angular reference positions of the pinion relative to both the rack and the sleeve can be adapted according to a predefined variation in the torque required for actuating the valve.

15 Claims, 8 Drawing Sheets

(56) References Cited

U.S. PATENT DOCUMENTS

| | | | | |
|---|---|---|---|---|
| 5,189,923 A * | 3/1993 | Lashbrook | ............ | F15B 15/065 |
| | | | | 74/409 |
| 2012/0319019 A1 * | 12/2012 | Burgess | ................ | F16K 31/088 |
| | | | | 251/129.11 |
| 2013/0175463 A1 * | 7/2013 | Burgess | ................ | F16K 31/041 |
| | | | | 251/129.03 |

FOREIGN PATENT DOCUMENTS

| | | | | |
|---|---|---|---|---|
| FR | 2 976 983 A1 | 12/2012 | ............. | F15B 15/06 |
| FR | 2 990 488 A1 | 11/2013 | ............. | F16H 19/04 |
| RU | 1 802 856 C | 3/1993 | | |
| RU | 1802856 A3 | 3/1993 | | |
| RU | 2 285 852 C2 | 10/2006 | | |
| SU | 319793 A1 | 11/1971 | | |

* cited by examiner

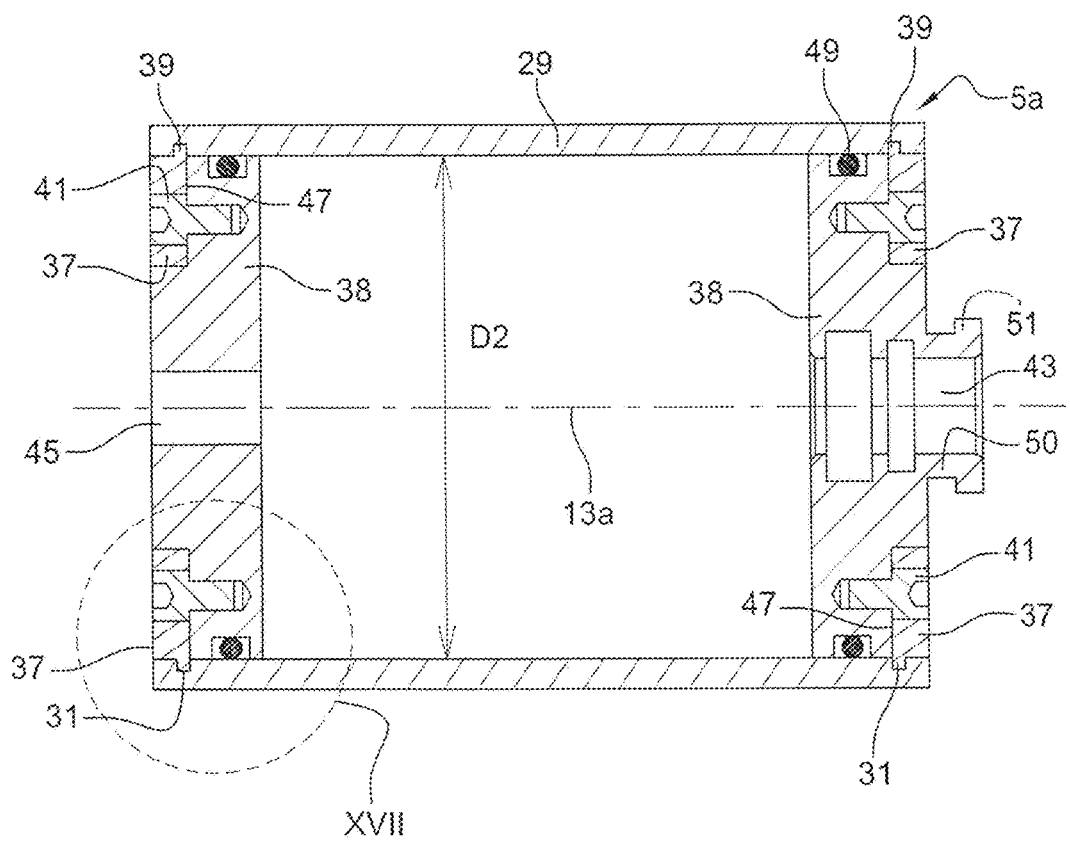
Fig. 16
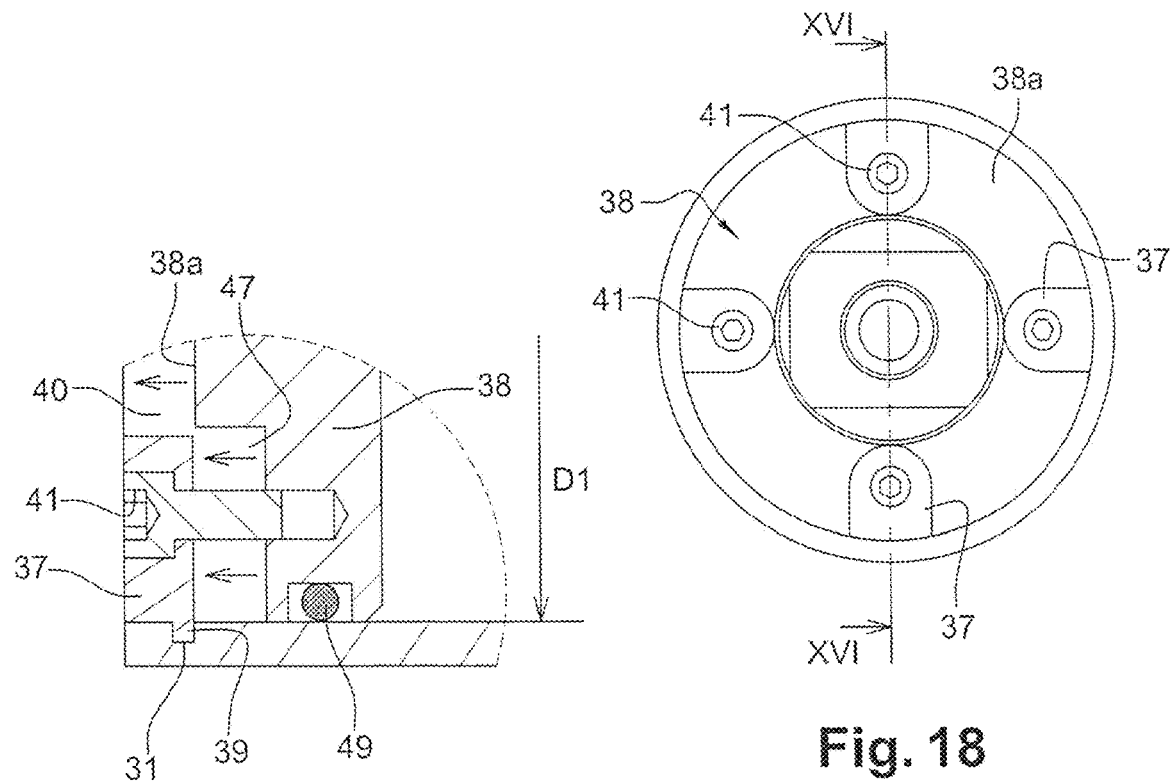
Fig. 17
Fig. 18

Fig. 21

| TYPE OF CONNECTION FLANGE | MAX. TORQUE ON THE FLANGE |
|---|---|
| F03 | 32 |
| F04 | 63 |
| F05 | 125 |
| F07 | 250 |
| F10 | 500 |
| F12 | 1 000 |
| F14 | 2 000 |
| F16 | 4 000 |
| F25 | 8 000 |
| F30 | 16 000 |
| F35 | 32 000 |
| F40 | 63 000 |

DIMENSIONS IN MILLIMETERS

| TYPE OF FLANGE | $d_1$ | $d_2$ f8 | $d_3$ | $d_4$ | $h_1$ max. | $h_2$ min. | NUMBER OF SCREWS OR BOLTS |
|---|---|---|---|---|---|---|---|
| F03 | 46 | 25 | 36 | M5 | 3 | 8 | 4 |
| F04 | 54 | 30 | 42 | M5 | 3 | 8 | 4 |
| F05 | 65 | 35 | 50 | M6 | 3 | 9 | 4 |
| F07 | 90 | 55 | 70 | M8 | 3 | 12 | 4 |
| F10 | 125 | 70 | 102 | M10 | 3 | 15 | 4 |
| F12 | 150 | 85 | 125 | M12 | 3 | 16 | 4 |
| F14 | 175 | 100 | 140 | M16 | 4 | 24 | 4 |
| F16 | 210 | 130 | 165 | M20 | 5 | 30 | 4 |
| F25 | 300 | 200 | 254 | M16 | 5 | 24 | 8 |
| F30 | 350 | 230 | 298 | M20 | 5 | 30 | 8 |
| F35 | 415 | 260 | 356 | M30 | 5 | 45 | 8 |
| F40 | 475 | 300 | 406 | M36 | 8 | 54 | 8 |

VALVE CONTROL DEVICE

FIELD OF THE INVENTION

The present invention relates to a solution for transforming a longitudinal force into a torque actuating a mechanical member, such as a tap or a valve, within the torque variations thereof. This solution applies to any mechanism requiring rotation with a variable torque.

More precisely, the solution disclosed here relates to:
a method both for preparing and performing the actuating of a member between two positions, such as a valve to be closed and opened,
and the corresponding actuating device.

BACKGROUND OF THE INVENTION

At least two actuators families, one based on the rack-and-pinion principle and the other based on the lever arm ("Scotch yoke") principle are known.

These two families are set: once the devices are manufactured and mounted in their casings, no adjustment of the transmitted torque is possible, with the risk of unsuitability to the operational requirements.

In the rack-and-pinion case, the torque is constant throughout the actuation. In the mechanism with a scotch yoke, the torque changes according to the variation in radius of the thrust axis relative to the axis of rotation. This variation is set and can only be changed by replacing the part with another one.

Among the methods of the aforementioned type, the document EP 0103744 discloses a solution where a valve can be opened and closed, using a rack meshing with a toothed elliptical rotating pinion, with the rack extending generally transversely to the axis of rotation of the pinion, following a curve which is the involute of at least a part of the primitive perimeter (or the diameter) of the pinion, with the pinion being connected with a sleeve so that one transmits a torque to the other.

A problem remains however as to the adaptation of the torque to the operational requirement to be met.

SUMMARY OF THE INVENTION

A proposed solution includes, in order to prepare and perform the actuation of a member, such as the aforementioned valve:
in operating said member to be actuated from at least one actuator such as a jack, controlled by a power source,
in having a separable pinion/sleeve connection and furthermore, in a variation in torque required for actuating the member being predetermined,
in selecting, according to the variation in torque to be provided:
the actuator,
the rack and the pinion, in a range of devices where two successive racks and two successive pinions in the same range, i.e. the racks amongst them and the pinions amongst them, have a size ratio between 1.20 and 1.80, and preferably equal to 1.50,
an angular reference position of the pinion relative to the rack and the sleeve,
in implementing and positioning the rack in the device with its involute curve, according to the predefined variation in torque,
in wedging the pinion in the device in its reference angular position relative to the rack and the sleeve,
and then in controlling the actuator, which, via the pinion, will actuate the member to be controlled.

This should will make it possible, one the hand, to vary the torque and, on the other hand, to adapt same to the effort required.

In a specific application, the relative position between the pinion and the rack according to the expected actuating speed of the member to be controlled is adapted.

This will thus make it possible to drive the opening and/or closing of valves by providing a varying rotation speed.

In order to limit costs, minimize the response time and simplify the production and mounting of the rack, it is also recommended that this step should include:
the fixing of pins in a plate, on said involute curve,
the mounting of the plate provided with said pins on a support from which the plate is removable, with the support being connected, or to be connected, to at least one rod connected, or to be connected, to the actuator.

Preferably, the specific characteristics of the shaping of the concerned pinion will enable at least three meshing pieces to engage with the flanks of the respective tooth of the rack. The dimensions of these pins depend on the torque to be transmitted and these may be made either of tempered steel and directly attached to the plate receiving same, or be provided with bushes rotating around their axis for fixing to the plate.

As regards the actuating device itself, the one proposed here provides a control of the considered member:
through at least one actuator in turn controlled by a motor,
and through a rack, which can mesh with a toothed rotating pinion, such as an elliptical pinion, the teeth of which, which develop according to a primitive perimeter, are located at several different radii, with the pinion being connected with a sleeve so that one transmits a torque to the other, with the device being such that the connections between the pinion and the rack are separable, so that the reference angular positions of the pinion relative to the rack and the sleeve can be adapted to a predefined variation in the torque required for actuating said member.

As regards the implementation and the positioning of the rack in the device, the following is recommended:
fixing pins in a plate, on said involute curve,
mounting the plate provided with said pins on a support from which the plate is removable, with the support being connected, or to be connected, to at least one rod connected, or to be connected, to the actuator.

The method will then easily adapt to the solution to be implemented.

As regards the production of the rack, specifically for mountings which require, for example, the closing of an open valve, a stronger torque at the end than at the start of the operation, whereas the torque does not have to vary much during approximately the first half of the operation, the involute curve of the rack is expected to have a bulge opposite the pinion, with the bulge being concave on the pinion side and convex on the opposite side.

As regards the production of the rack again, it is recommended, as already indicated, for simpler production and mounting of the rack, that it should include a series of cylindrical shafts (hereafter called "gear pins") positioned on the curve of the involute of the primitive perimeter (diameter) of the pinion, along mutually parallel axes, also parallel to the axis of rotation of the pinion, and which mesh, for some at least, with the pinion.

The rack may comprise two stacked parts so fitted together as to let the central part thereof free, so that the pinion can go inside to contact the meshing pins. The rack will be able to slide in a recess provided for this purpose in an outer casing of the device, in a direction generally transverse to the axis of rotation of the pinion, and within a fixed distance from the axis of rotation of the pinion. The two transverse ends of the rack will preferably have (threaded or otherwise) hooking systems enabling the transmission of forces between the actuator (rod) and the rack.

To make up for mounting clearances and possible wear, a roller or skid system may be attached to the casing at the back of the rack and an adjusting screw may act on the rack.

Besides, in order to have a better control of the mounting times (or even dismounting times, in case of assistance or repair) of the device, it is recommended that the actuator, which has an axis, should include:

a cylinder internally grooved on the periphery and open axially at least on one side, a piston moving in the cylinder, along said axis, with the piston comprising a rod (preferably detachably) connected to the rack, cleats which each have a peripheral projecting area, at least one cylinder bottom axially closing the open side of the cylinder and having external recesses receiving the cleats, the projecting zone of which is then engaged in the groove of the cylinder, and removable fixing means such as screws, engaged in the cylinder bottom through the cleats.

Additionally, the cylinder bottom shall preferably be provided with a peripheral seal and have a diameter substantially equal to the internal diameter of the cylinder, in order to be able to tightly slide into the cylinder for the purpose of engagement or disengagement of the cleats.

The last two paragraphs above relating to the (each) actuator and the cylinder thereof and the foregoing on the device with the pinion/rack/sleeve solution may be separated and thus define solutions independent from each other.

Besides, other characteristics and advantages may also appear in the more detailed description that follows together with illustrations.

BRIEF DESCRIPTION OF THE DRAWINGS

FIG. 16, 17, 18 respectively show an enlarged view of the section of one of the actuators of FIG. 1 (XVI-XVI section in FIG. 18), an enlarged detail of the actuator (area XVII in FIG. 16) and an outside view of the actuator (arrow XVIII in FIG. 1).

Figure 21:
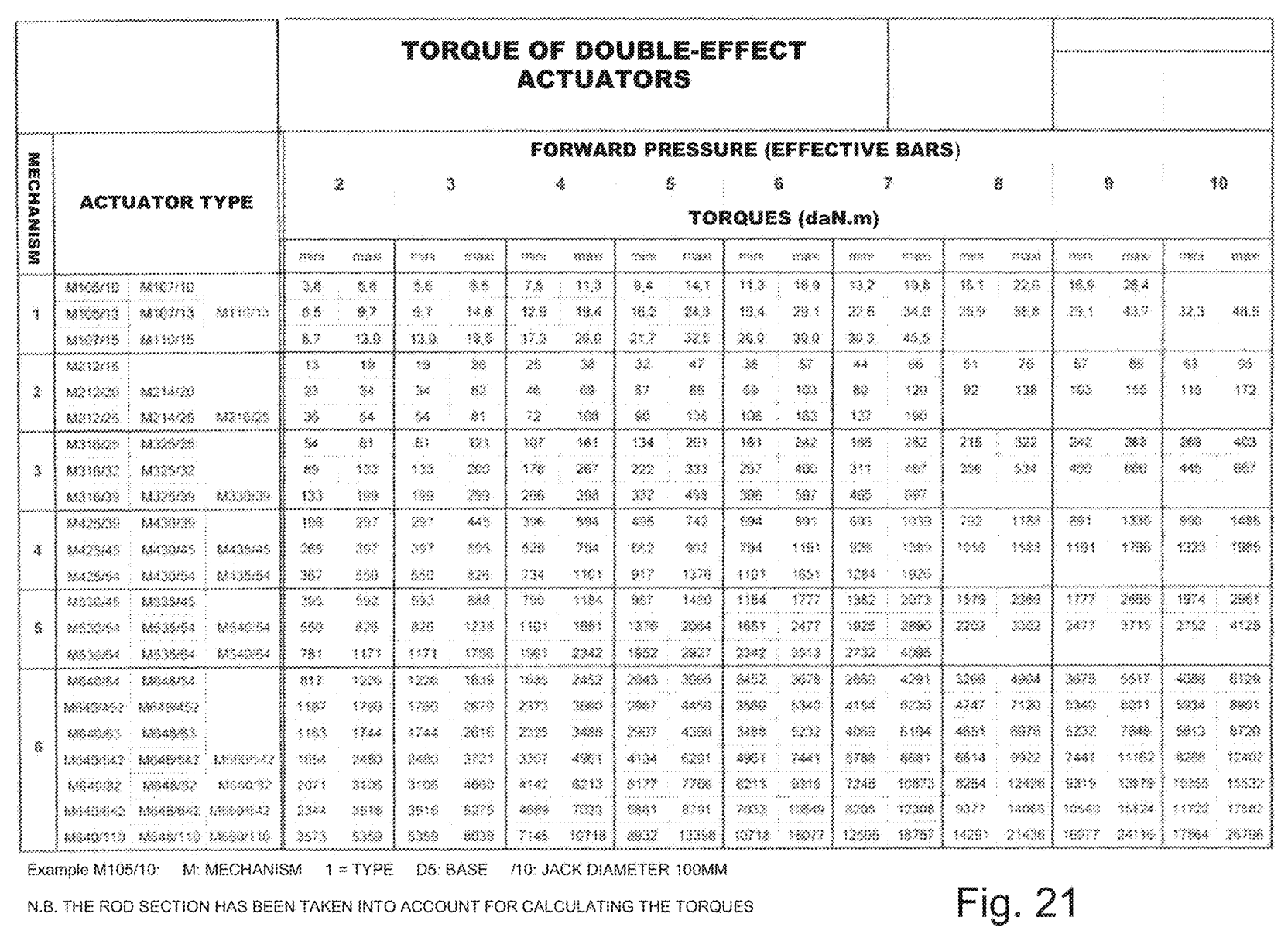

FIGS. 21, 22 show correlation tables and a mounting diagram.

DETAILED DESCRIPTION OF THE INVENTION

Figure 1:
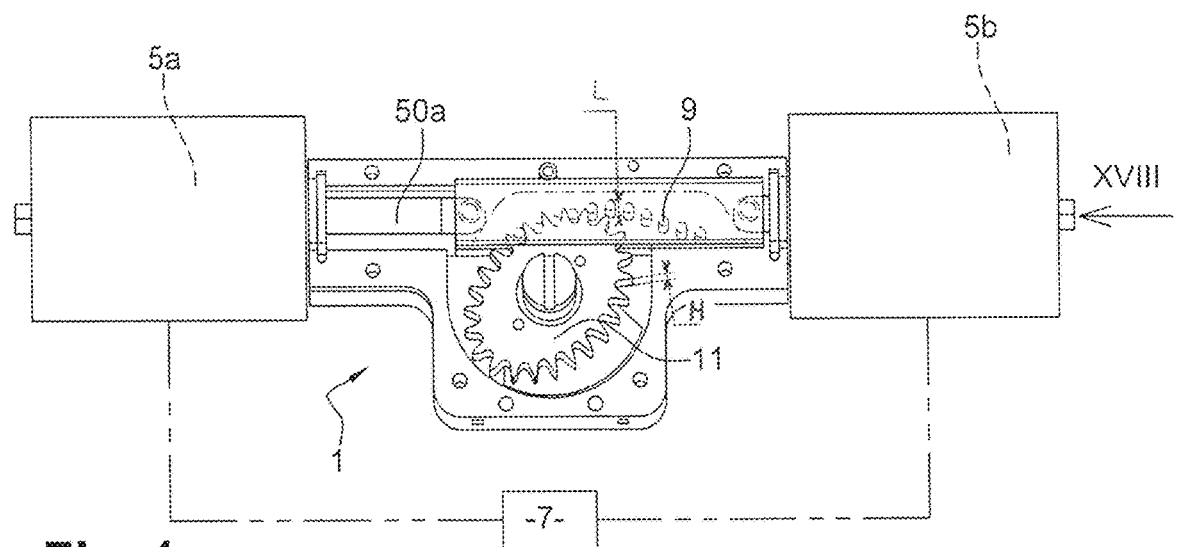
FIGS. 1, 2, 3 show details of an operational device as presented above, i.e. in a sequence the inner front view, the outer top view, and a longitudinal sectional view.

FIGS. 1-4 in particular show that the illustrated device 1 is used for actuating, between two positions, a member 3, such as a valve to be closed and opened, from at least one actuator, such as 5*a*, 5*b*, such as a piston/cylinder, controlled by at least one power source 7 (shown only in FIG. 1).

The power source(s) 7 may be a pneumatic source, such as a source of compressed air, and/or a hydraulic source or, for one source if there are several ones, return means such as a spring.

Figure 2:
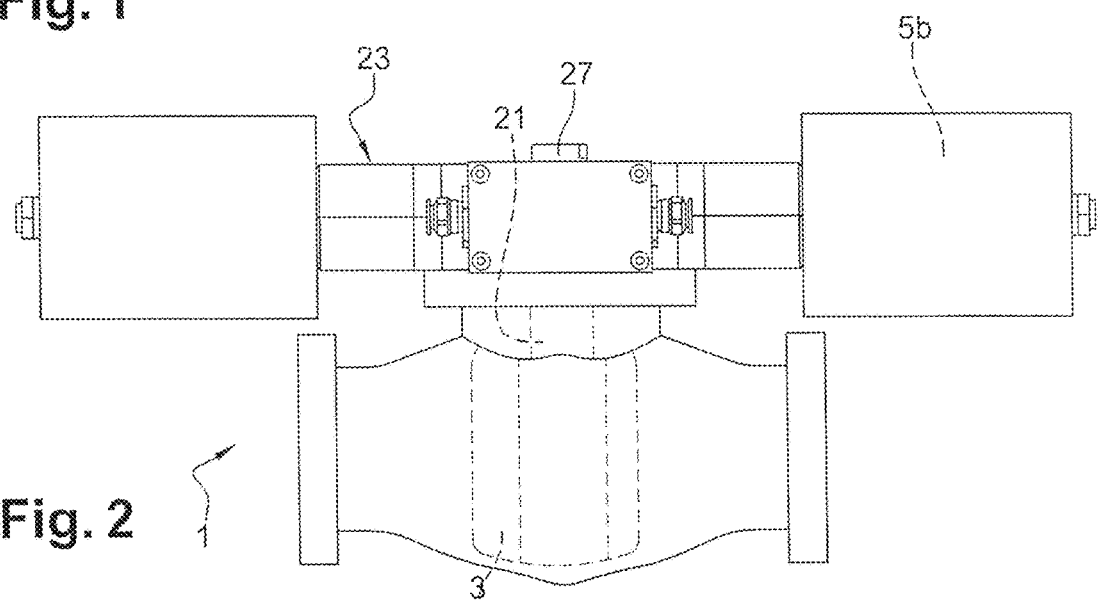
Figure 3:
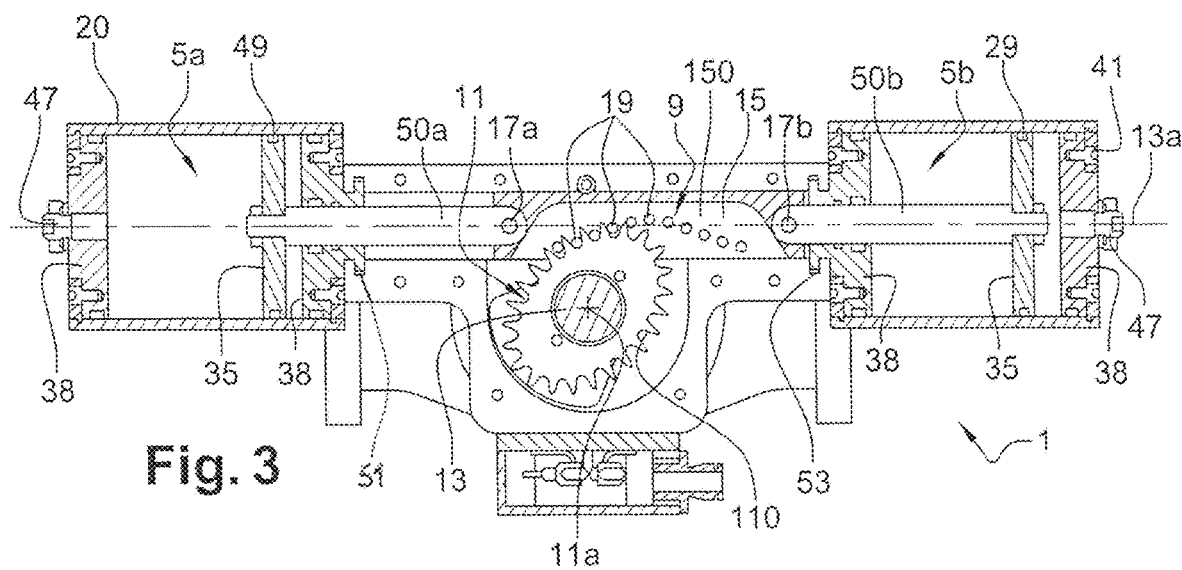

FIGS. 2 and 3 illustrate a valve 3, which is shown in dotted lines when closed and in mixed lines when opened.

The valve 3 is actuated by a rack 9 which can engage with a toothed rotating pinion 11 the teeth of which, which develop according to a primitive perimeter, are located at several different radii.

Such radii determine the minimum and maximum available torques.

The pinion 11 has an elliptical section, as illustrated in FIG. 3.

Figure 11:
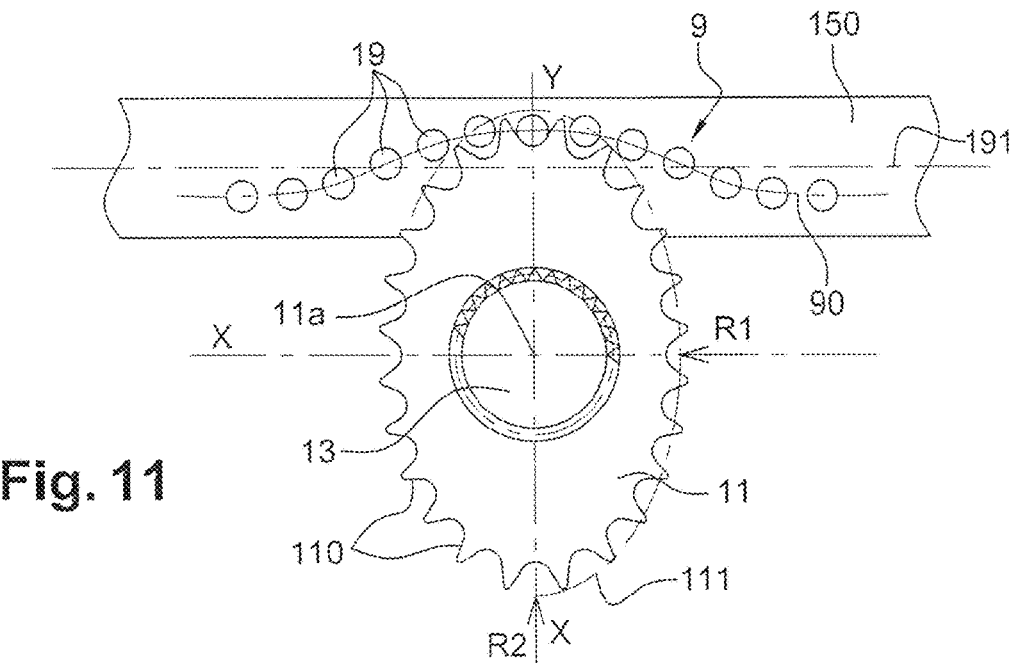
FIG. 11 shows a rack with pins attached on a plate, the pinion being shown in an enlarged front view.

The rack 9 globally extends (i.e. within limits of 5°) transversely to the axis 11*a* of rotation of the pinion 11, generally in the direction 191 along which the involute curve of at least a part of the primitive perimeter of the pinion (at the location of the peripheral teeth 110; in FIG. 11) extends.

The involute curve 90 of the rack generally extends transversely (i.e. within limits of 5°) to the axis 11*a* of rotation of the pinion.

The pinion 11 is also linked with a sleeve 13 so that one transmits a torque to the other. In practice, this torque will be proportional to the one applied to the pinion 11 by the rack 9, itself driven in translation by the actuator(s). The pinion 13 is carried by (or fixedly attached to) a rotating shaft 21 to which the member 3 to be actuated is fixedly connected (refer to FIG. 2).

In the preferred example shown in FIG. 3, there are two actuators 5*a*, 5*b* positioned respectively in the extension of two opposite ends of the rack support 15. There could be only one, on one side.

These ends are located at two opposite ends of the support 15 along the axis 13*a* along which the curve 90 globally/mainly extends.

The device 1 is further configured such that the connections between the pinion 11 and the rack 9 as well as the sleeve 13 are separable.

The reference angular positions of the pinion relative to the rack and to the sleeve, according to a predefined variation in the torque required for actuating the member 3 can thus be easily adjusted.

Here "reference angular position" refers to the angular position of the part concerned before the rod(s) such as 50*a*, 50*b*, of the actuator(s) start(s) to translate.

It should be noted that the shaft(s) 50*a*, 50*b*, individually extend(s) on the lateral extension of the support 15, along the shaft 13*a* (refer to FIG. 3).

The part of the mechanism comprising the rack 9, the pinion 11, the sleeve 13, the rack support 15, can be accommodated in a casing 23 comprising two parts 23*a*, 23*b* which may he symmetrical, thereby enabling a reduction in machining costs. Laterally, openings, such 25*a* in FIG. 2, let the concerned rod 50*a*, 50*b* through. From the front, another opening in the casing 23 may let a short-split shaft 27 through, which extends coaxially with the rotating shaft 21, opposite thereof relative to the pinion 13 which it is fixedly attached to, for a manual actuating of the member 3, if necessary (refer to FIG. 2).

As can be noted in FIG. 1, the positioning of the rack 9 in the device 1 will preferably comprise a connection thereof to a/the rod(s) 50*a*, 50*b* then already connected, or still to be connected, to the concerned actuator.

In FIG. 1, the bolts 17*a*, 17*b* attached to the rack support 15 are used for such a removable connection.

As regards this support and the rack, it is also recommended that the production and positioning of such rack in the device should include:

attaching pins 19 in a plate 150 along said involute curve 90, mounting the plate 150 provided with said pins 19 onto the support 15 which the plate will preferably be removable from, with the support being connected, or to be connected, to a/the rod(s) 50*a*, 50*b* connected, or to be connected, to the actuator(s).

It will thus be easily possible to change the shape and/or the position of the rack (its involute 90), simply by changing the plate, all the more so if pins 19 have been used.

The plate 150 may then be screwed to the support 15.

The pins 19 can be screwed to or forcedly engaged into holes of the plate 150. They will extend along axes parallel to each other and to the axis 11*a* of rotation of the pinion, and advantageously more than two will mesh with the pinion.

Such pins (so-called gear pins) 19 will preferably be cylindrical. They may be mounted fixedly or be free to pivot each about its axis of mounting, like bushes.

Figures 5, 6:
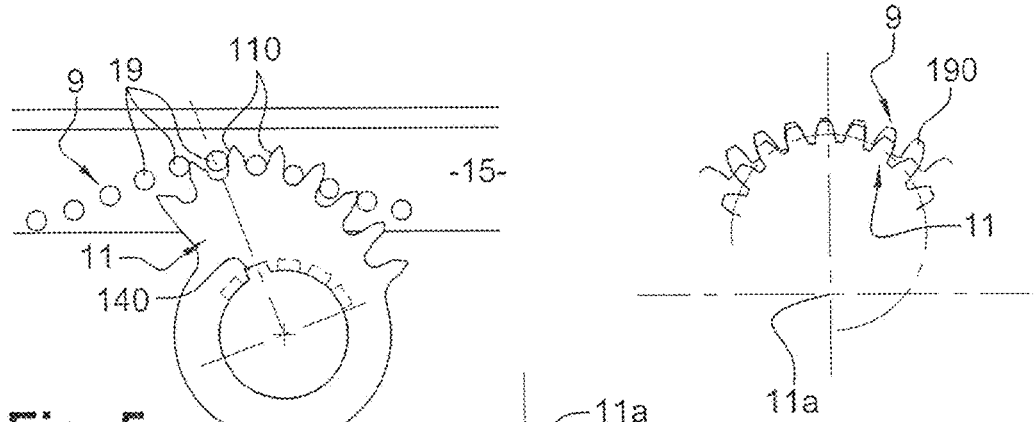
FIGS. 5 and 6 respectively show a partial toothed pinion, with the pinion being connected to the sleeve by means of a key, and a pinion/rack connection by means of teeth.
Figure 7:
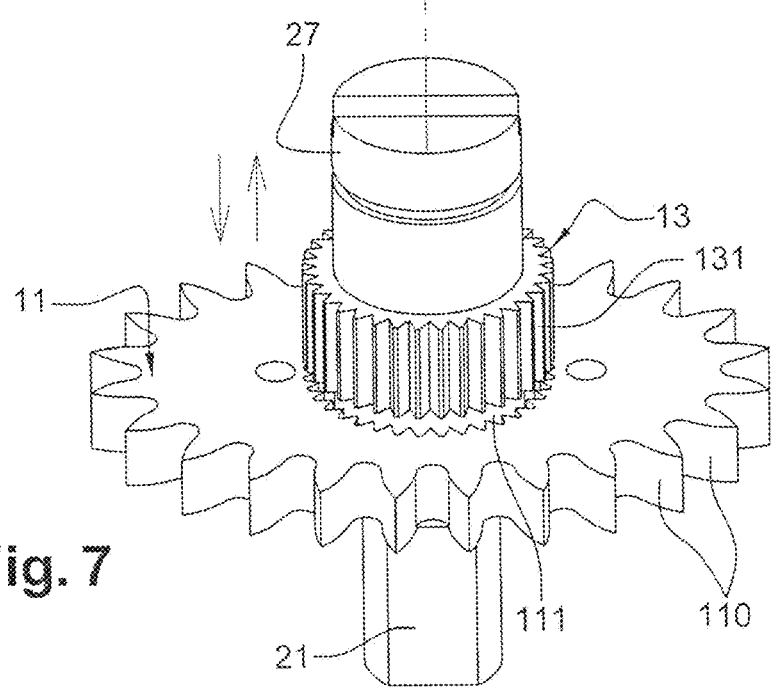
FIG. 7 shows separated pinion and sleeve to enable a suitable angular wedging.

FIG. 6 shows that instead of pins 19, the rack 9 may comprise a toothing 190 meshing with the external teeth of the pinion 11. The pins 19, however, are advantageous in that they are easily provided on the involute 90, and the latter can be changed (for instance by positioning the pins in a different location) if a redefinition of the change in the torque controlling the member 3 is required.

As regards the separable connection between the pinion 11 and the sleeve 13, it has been envisaged in particular in two possible ways:

by toothings 121, 131 (via a bore as seen in FIGS. 3, 7, 8, 11 . . . ), by at least one movable key or pin 140 (as shown in FIG. 5), In the case of mobile pin(s), it may include a key.

Thus, for actuating the valve 3, the following will be possible, in order to adapt same as much as possible to the variable torque requirements:

predefine a variation (which may be required by the client) in the torque as required by the actuation of the concerned member, such as the valve 3, depending on the force required to ensure said torque variation to be provided, select:

the number and/or the type of actuators, or even of power sources, the reference angular position of the pinion 11 relative to the rack 9 and the sleeve 13, according to the predefined torque variation, realize then (fixedly but preferably removably) position the rack 9 with its involute curve 90 in the device, wedge the pinion 11 in the device 1 in its reference angular position relative to the rack and the sleeve, then, control the actuation of the power source 5*a*, 5*b*, which, via the pinion, will actuate the member 3 between these target positions.

Figure 12:
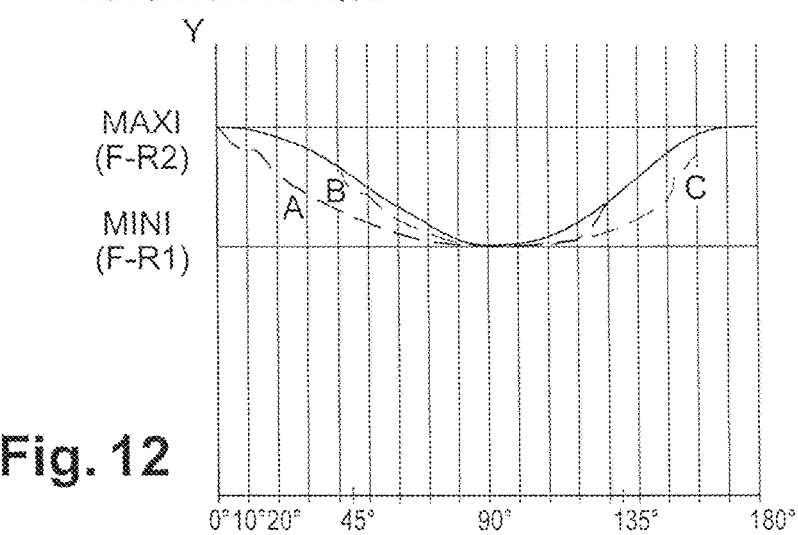
FIG. 12 shows the curve of a force delivered by the actuator for a 180° rotation; the force curves of a valve to be controlled, for a 90° rotation, according to the examples A-B-C in FIGS. 13, 14, 15 are optimally located on this curve.

FIG. 12 shows, for a 180° rotation, three curves of the force issued by the (each) actuator, in three different cases (examples A-B-C).

Figures 13, 14, 15:
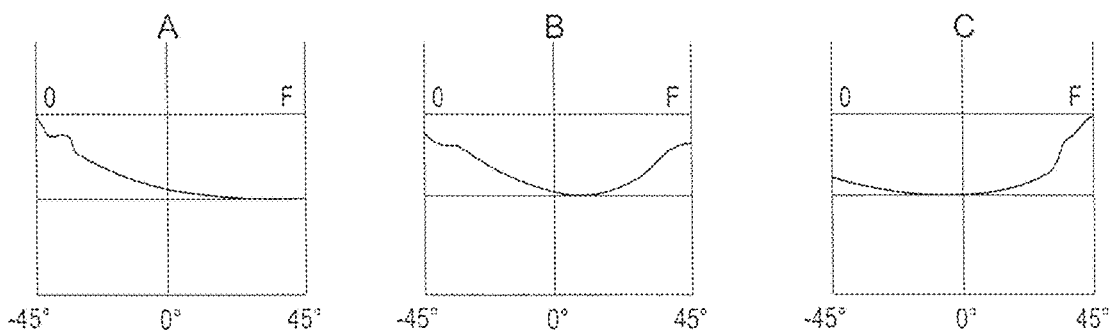

These curves, individually shown in FIGS. 13-15, each show the optimal adaptation of the force curve of the device relative to the force curve required by the valve (member 3), for a 90° rotation; examples A-B-C in FIGS. 13-15, respectively.

This optimization can be done:

by shifting the pinion 11 on its sleeve, by the required angle (for instance, by as many teeth as required)

and by positioning the rack 9 on the corresponding tooth.

A tooth may correspond to a 10° shift.

If necessary, the imposed ratio between the radii of the pinion 11 (for instance 1/1.5) may be adapted to the torque of the valve 3 by changing the reference angular position of the pinion on its sleeve 13.

It will be thus possible to position the pinion either during the mounting or after the delivery according to the requested characteristics.

It should also be noted that, although in most cases the pinion is used over an angular sector of 90°, the above solution allows, with appropriate adjustments, an angle of 180° or 360° or more. Eventually, as the pinion is symmetrical, using unworn toothed parts is possible in case of wear.

One possibility provided when using the device 1, with the pinion 11 with variable radii and the rack 9 with the curve 90 meshed therewith, is to apply such characteristic to the actuation of the member to be controlled, by adapting the relative position between the pinion 11 and the rack 9, and specifically the angular position of the pinion opposite the rack, according to the expected actuating speed of the member 3.

It will then be possible to adjust the device according to the expected closing and/or opening speed of the valve.

As a matter of fact, a valve, or any other member driven by an elliptical pinion has a variable speed of rotation, since the peripheral speed of a rotating point is given by the following relationship $V=2\pi rn/60$, where n is the number of rotations and r is the radius of the pinion at the place of calculation of the speed.

Figure 10:
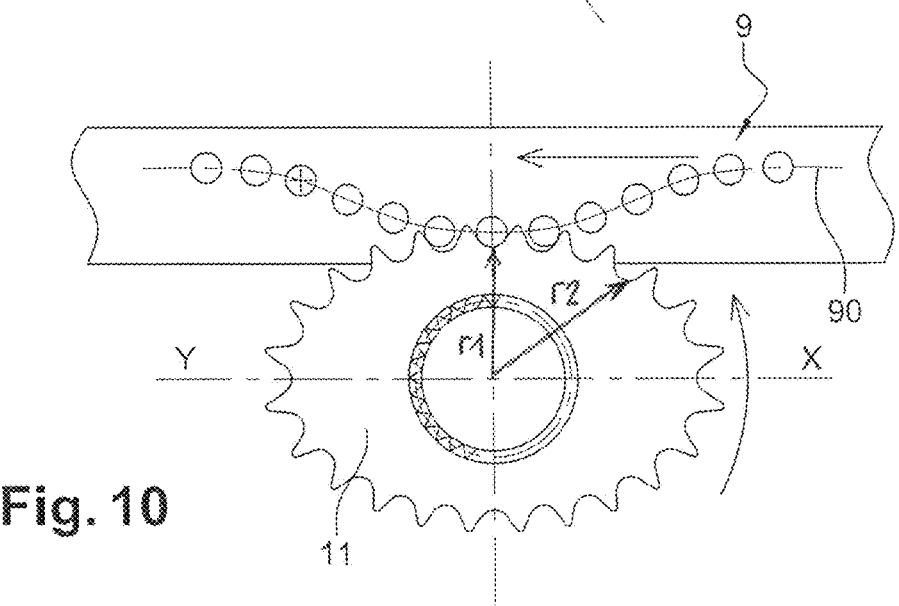

If it is assumed that the speed of the rack moved by the actuator(s) 5*a*,5*b* is constant, as is the case for the pinion 11 and, for instance, as shown in FIG. 10, we obtain $r1>r2$ and thus: $V1=2\pi r1n/60$ and $V2=2\pi r2n/60$; i.e. $V1>V2$.

A variable member 3 closing and/or opening speed will then be obtained, with an inlet data provided by the actuator (s), by acting on the relative angular wedging between the pinion 11 and the rack 9.

FIG. 5 shows a case where the external teeth 110 of the pinion extend over an angular sector of approximately 90° only, which, in some cases, may be sufficient.

Figure 8:
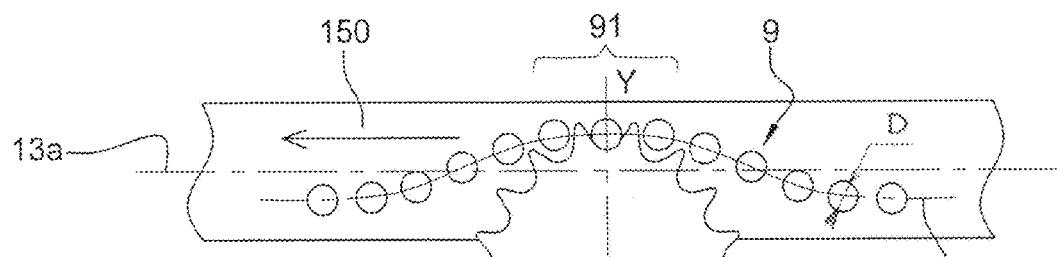
FIGS. 8, 9, 10 illustrate three different wedgings of the pinion, with two different embodiments of the rack.
Figure 9:
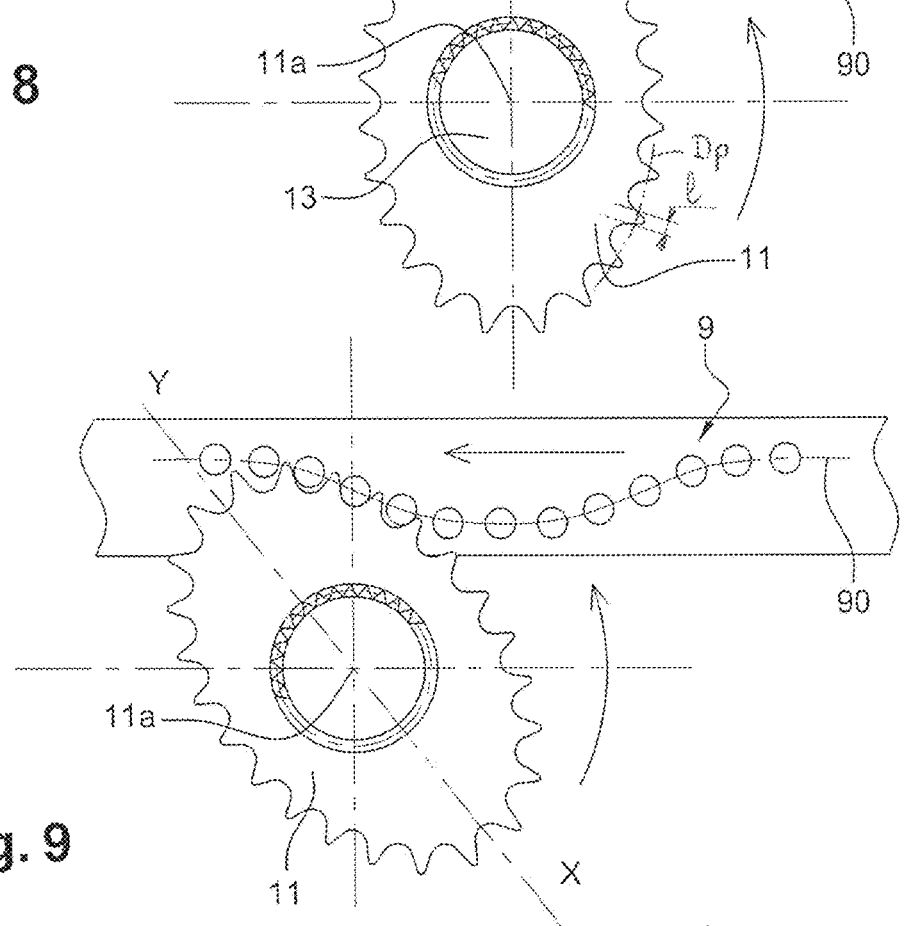

FIGS. 8-10 show three different angular wedgings of the pinion 11, with three different forms of the involute curve 90 of the rack 9, according to the curves A-B-C respectively, in FIGS. 13-15.

It can be noted in FIG. 8 that the illustrated curve 90 (the case of curve A) can thus have, opposite the pinion 11, a bulge 91 which is concave on the pinion side and convex on the opposite side. In the other two cases (FIGS. 9, 10) the opposite is true: convexity on the pinion side and concavity on the opposite side. Greater details on the settings selected in each case are given in the captions Thus, in order to make, in practice, a device 1 operational, in order to motorize the control of a valve over 90°, the following steps can be executed, in connection with FIGS. 8-10:

The maximum torques for the operation of this valve are first taken into account; let us assume:
90 daN at the start of the opening,
80 daN during the opening travel,
120 daN at the end of the opening.

Then, is selected from a list of available actuators, the one that covers the above torques.

Let us assume a size 2 actuator equipped with a 250 mm diameter jack, under a pressure of 8 bar ($10^5$N) delivering max 137 daN and min 88 daN.

The final positioning of the elements according to the XY vertical axis (refer to FIG. 8 and the curve A), the clearance of tooth on the pinion in 1, the central sleeve 13 with the clearance of tooth 1 along the vertical axis and tooth 1 of the bore in the pinion 11.

Upon completion of the tests, it can be noted (in this example) that in the selected configuration, the torques are too high at the start of the opening (137 daN when 90 daN are requested), whereas they are too low at the end of the opening (88 daN when 120 daN are requested).

When looking at the charts of the preset torques for each pinion and each clearance of tooth, reaching respectively 93.2 daN whereas 90 daN are requested and 131.7 daN when 120 daN are requested would be possible, using the clearances of tooth 6 to 11 (90°), as they cover the identified requirements.

Once the clearances of tooth to be used are defined, the suitable standard rack in stock can be selected and/or for example the matching holes of the pins 19 can be drilled in the plate 150, following the involute 90 which has just been defined.

The rest of the mechanism can then be fitted with the appropriate angular setting (refer to the Figures).

Thus, once the involute 90 of the rack is made, it will be sufficient to match the positions of the recesses of the pinion 11 teeth, while angularly adapting (shifting) the position of the pinion relative to the sleeve 13, through the releasable (thus angularly adjustable) connection established between same.

From the foregoing, it will be understood that the device which can be realized, with various possible adjustments and adaptations, although designed especially for the motorization of valves and taps, can be used in every mechanical field requiring the same characteristics as those mentioned above.

Considering now the production of the actuator(s), it should be noted what follows, specifically in connection with the FIGS. 3 and 16-18, it being reminded that the following could be separated from the above as regards the device with the pinion/rack/sleeve solution and thus define an independent solution for:

an attaching device for a flange or a cylinder bottom, inside which a jack (or piston) is mounted (or to be mounted), and/or, a rack actuator adapted to drive the latter in translation.

To summarize, in both cases, this is a solution wherein the actuator has an axis and comprises:

a cylinder internally grooved on the periphery and open axially at least on one side,
a piston (or a jack) moving in the cylinder, along said axis,
cleats which each have a peripheral projecting area,
at least one cylinder bottom axially closing the open side of the cylinder and having external recesses receiving the cleats, the projecting zone of which is then engaged in the groove of the cylinder, and
removable fixing means such as screws, engaged in the cylinder bottom through the cleats.

In order to further facilitate the mounting/dismounting operations, it is recommended that the cylinder bottom should be provided with a peripheral seal and have a diameter substantially equal to the internal diameter of the cylinder, in order to be able to slide tightly into the cylinder, for the purpose of engagement or disengagement of the cleats.

For a detailed presentation of the above, FIGS. 3 and 16-18 show that the axis of revolution of the actuator, such as 5a shown here, is the axis 13a and comprises:
a cylinder 29,
a piston 35 moving in the cylinder, along the axis 13a,
cleats 37 which each have a peripheral projecting zone 39,
at least one cylinder bottom 38 axially closing an open side 40 of the cylinder, and
removable fixing means 41 such as screws, engaged in the corresponding cylinder bottom 38 through the concerned cleats 37 (refer specifically to FIG. 17).

In FIG. 16, it is axially open on both sides (reference 40 on one side in FIG. 17) and two bottoms 38 respectively cover the openings, sealed to the fluid contained in the cylinder. The piston 35 can then move between the two bottoms 38, in the concerned cylinder 29. On one side, it is fixedly attached to (or includes) the rod, such as 50a or 50b, driving the support 15 of the rack, which rod extends through an axial passage 43 provided in the corresponding bottom 38. On the opposite side, another axial passage 45 provided in the other bottom 38 is closed by a plug 47 (in FIGS. 3, 16).

The/each cylinder bottom 38 also has, externally (face 38a) recesses 47 adapted to receive one cleat 37.

The periphery of the/each cylinder 29 is also internally grooved, at 31, to receive therein the projecting peripheral zone 39 of the concerned cleats 37, which are then engaged in their recesses 47.

For an easy and reliable (sealed) engagement or disengagement of the cleats, it is recommended that the (each) bottom cylinder 38 should be provided with a peripheral sealing device 49 and should have a diameter D1 substantially equal to the internal diameter D2 of the cylinder in order to be able to tightly slide into the cylinder.

With the cleats solution disclosed above, the former versions using either tie-rods or screws or snap rings, or threads, will be avoided, the drawbacks of which more or less significantly impact the price or the mounting/dismounting times.

It should be noted that the solution presented is advantageously applicable for a diameter D2 beyond 200 mm.

The cleats attaching means 41 (such as the screws shown) are used to axially draw the flange or bottom 38 in position, in the course of the mounting, and hold the cleats in their recesses 47, once the means 41 are blocked. The groove 31 in the cylinder may be continuous (lathe machining) or partial (milling machining).

Preferably, a minimum of three cleats is required. And preferably, the front shape of the cleats will have the particularity to closely conform to the nominal diameter D2 of the cylinder, the bottom diameter of the groove 31, and the width of same groove. These values determine, with the length engaged, the resistant section of the cleat. The rounded rear shape (refer to FIG. 18) is determined for a clearance-free support and preferably for accommodating a fastening flush head screw, in addition to an easier production. The thickness of the cleats and the depth of the recesses 47 will preferably be so provided that no part is protruding.

The added cleats solution is particularly suitable for cylinders with pneumatic and hydraulic jacks used for motorizing valves and taps; but not only therefore.

It should be noted too that, in FIGS. 3 and 16 the cylinder bottom 38 (or one of the bottoms) will advantageously be provided, along the axis 13*a*, with a hollow projecting tip 50 through which the rod (such as 50*a* or 50*b*) of the actuator connected, or to be connected, to the rack 9 will pass.

To facilitate, secure and obtain quick connection (or disconnection) between the actuator 5*a*, 5*b* and the rest of the drive mechanism of the member 3, it is recommended:

that the protruding tip 50 should be provided with a rim 51, and, that the casing 23*a* (wherein the rack, the pinion 11 and the sleeve 13 are accommodated) should have an inner groove 53 adapted to receive the rim 51, and for locking it therein.

Figure 4:
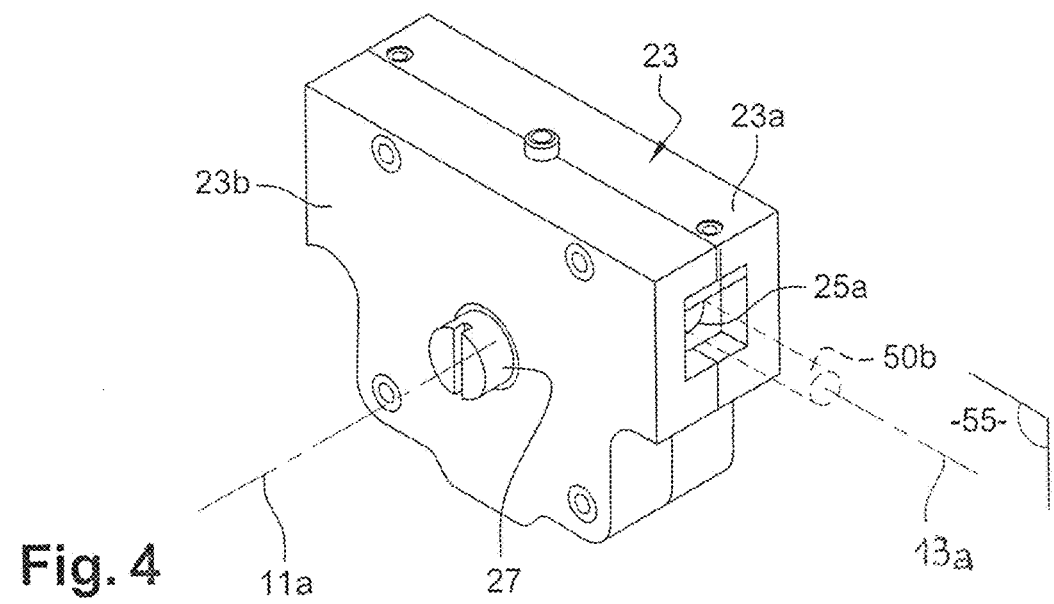
FIG. 4 shows the outside of the device without an actuator.

One design of the casing 23 in two parts 23*a*, 23*b* (assembled in the plane 55 containing the axis 13*a*; refer to FIG. 4) will facilitate both the engagement and the disengagement of the rim 51 with or from the inner groove 53.

Figure 19:
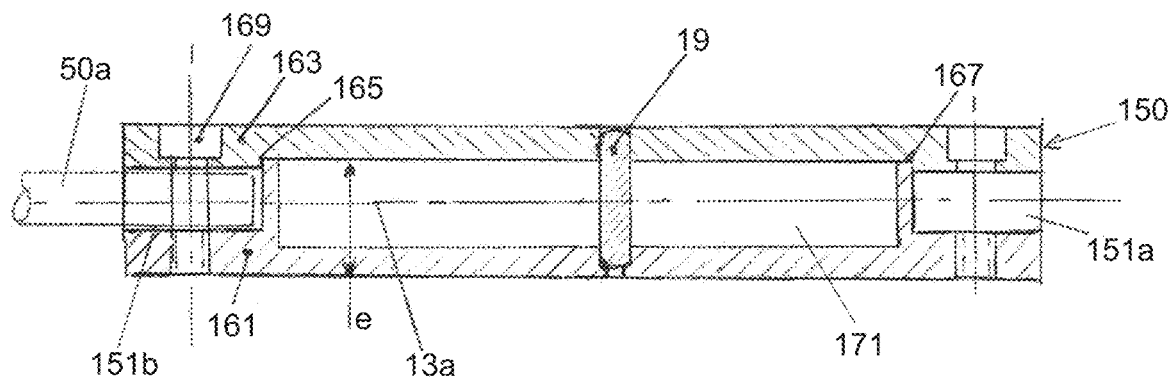
FIG. 19 shows a possible embodiment of a part of the rack.

As regards FIG. 19, some clarifications on the rack 11 are given hereunder and may be usefully implemented, in part or in whole:

a) the plate 150 or the support 15 (if there is no plate) shall be comprised of two parts 161, 163, respectively, b) the first part 161 of such plate or support will be machined and will have a thickness e as required for accommodating, in its central part, resurfaced pins 19, with or without any bush, and both ends 151*a*, 151*b* thereof will be so machined as to axially receive (axis 13*a*) the force transmitting shafts, such as the shaft 50*a*.

c) the recess for the pins in the first part 161 will be machined with two diameters. The first diameter will match that of the pin, which will be tightly fitted and the second one will have a smaller diameter which will not enable the pin to go out, but will make it possible to introduce a tool in case of dismounting, d) the second part 163 will be so machined as to lock the pins in position. The pin recess can be provided as in point (c) above, or with a unique diameter, wherein the pin 19 will be tightly fitted, e) the upper part and the lower part will be so machined as to be embedded (in 165 and 167) and integral with each other in the longitudinal axis (axis 13*a*), so that the stress is not transmitted to the pins in an unbalanced way. When both parts are embedded, at both ends, a precise recess will be provided, and thus enable the positioning of the transmission shafts on the one hand, and, on the other hand, the accommodation of the attaching and force transmitting screws 169.

f) in this case, a central space 171 will be defined, between the first and second parts 161, 163, so as to enable the meshing of the rack and the pinion, without any friction.

According to a significant characteristic, it is provided that the above mentioned actuating device 1 will belong to a range of devices 1 where two successive racks 9 and two successive pinions 11 in the same range, i.e. the racks amongst them and the pinions amongst them, have a size ratio between 1.20 and 1.80, and preferably equal to 1.50.

A survey thereon has shown that such ratio optimally corresponds to the size and the torque of the valves 3, as well as to the attachment bases 60, 62 (FIG. 19) compatible with ISO 5211 standard.

As regards the racks 9 and pinions 11, such size ratio will be specifically true for the section (diameter D in FIG. 8) and the length (L in FIG. 1) of the rack pins 19, and for the height (H in FIG. 1), the primitive diameter (Dp in FIG. 8), the width (1) of the teeth 110 and the spacing (angle) between two successive teeth of the pinions. Said size ratio will thus be advantageously applied to the sleeve, or shaft 13 and to the rotating shaft 21, at least as regards the diameter thereof.

The actuating devices 1 of the range will preferably be mutually homothetic.

The actuators 5*a*, 5*b* are not, a priori, concerned. However, it (they) will be so selected as to obtain the torque to be delivered to the valve, after determining the characteristics of the jack and the pinion/rack pair to be used.

Some brainstorming on the existing range of actuators led to aiming at a ratio between the size and torque parameters, in order to improve the quality and the performances of the existing valve control devices, with reduced costs and a good reliability.

Figure 20:
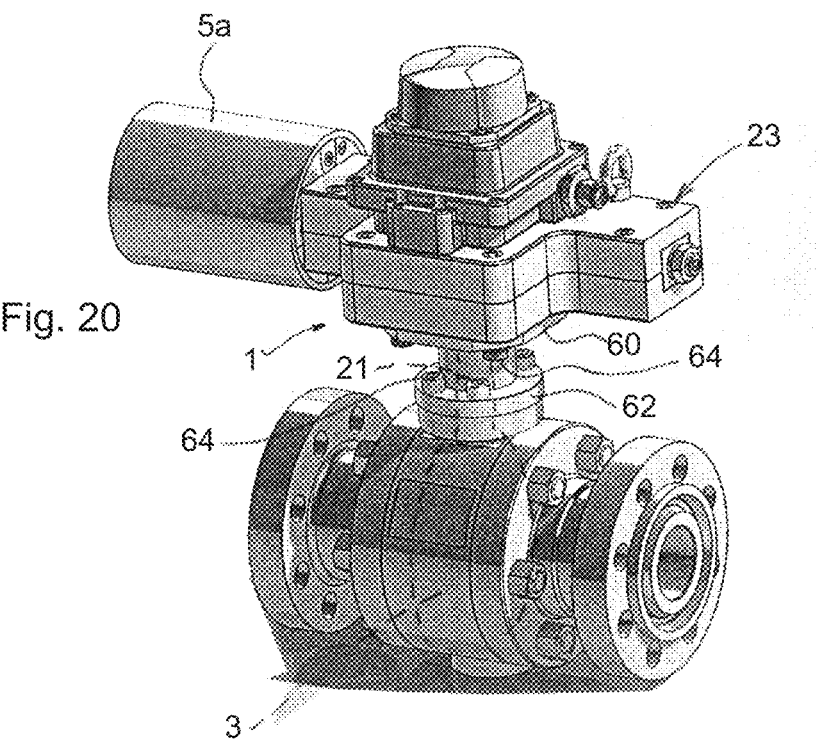
FIG. 20 shows a valve body connected with the actuating device according to the invention.

Analyzing the table of FIG. 20 shows the importance of such ratio on all the characteristics of the device.

It can also be noted that:

in the «Mechanism» column, the six mechanisms are homothetic. A coefficient of 1.5 determines the dimension difference between two successive sizes of the mechanism, in the «Actuator Type» column, the size of the actuator and the type of jack used are determined, in the «Torque» columns are mentioned the mini/maxi torques delivered by the actuator at the given pressure. It can be seen that the 1.5 ratio regularly and consistently steps the selections, from the mini torque of 3.8 daN·m to the maxi torque of 26796 daN·m.

In the table, for each mechanism, boxes with various colours can be seen. Each color corresponds to an attachment complying with ISO 5211 standard, which corresponds to the torque accepted by the valve 3.

Therefore, it can be seen that, for an exemplary mechanism 1, three attaching means between the valve 3 body and the device 1 (via the base) are possible: F05, 07 and 10 (refer to the details in FIG. 22).

The 1.5 ratio thus conveniently conditions the size of the actuators, the attachment thereof on the flange 62 of the valve and the corresponding torque.

The minimum and maximum torques applied to the valve, for each type of mechanism (i.e. specifically for each pinion/rack pair), actually comply with the 1.5 ratio.

This implies that the sizes of the pinions/racks pairs also have a ratio of about 1.5, for the racks amongst them and the pinions amongst them, at least, as already mentioned above.

Figure 22:
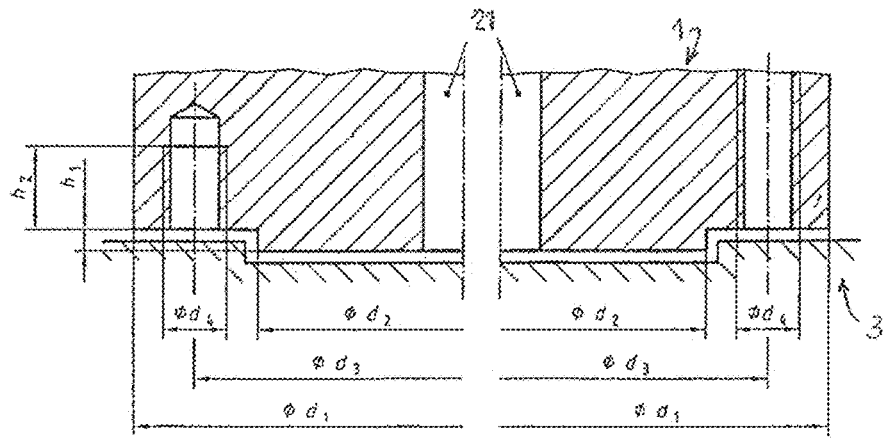

As for the tables in FIG. 22, they show the types of the flanges 60 (between the actuator and the valve) and the screws or bolts 64 to be associated therewith to connect the device 1 and the valve with the member 3 (FIG. 20), as per the ISO 5211 standard.

Having described the invention, the following is claimed:

1. A method for preparing and producing devices, each for actuating a member that is operable between two positions, by use on each of the devices of at least one actuator controlled by a power source, and a rack positioned in a meshing connection with a toothed rotating pinion having teeth which extend on a primitive perimeter or diameter and are situated at a plurality of different radii, wherein the rack extends generally transversely to the axis of rotation of the pinion, on a curve which is the involute of at least a part of the primitive perimeter or diameter of the pinion, the pinion connects with a sleeve so that one of the pinion or the sleeve transmits a torque to the other of the pinion or the sleeve, and the meshing connection is separable, said method for preparing and producing the device comprising:
providing the member having a predefined variation in torque required for actuating the member; and
selecting the following according to the predefined variation in torque:
one of the actuators,
one of the racks and one of the pinions, from a group of said devices where two successive racks and two successive pinions in the same group of devices have a size ratio between 1.20 and 1.80; and
an angular reference position of the selected pinion relative to the selected rack and the corresponding sleeve;
implementing and positioning the selected rack in the device according to the predefined variation in torque, wherein said selected rack is implemented and positioned in the device on the involute; and
fixing the selected pinion in the device in its reference angular position relative to the selected rack and the corresponding sleeve, wherein when actuation of the selected actuator is demanded, the pinion actuates the member between said two positions,
wherein the step of selecting one of the actuators comprises selecting said actuator having an axis and comprising:
a cylinder internally grooved on a periphery and open axially at two opposite end sides,
a piston movable in the cylinder, along said axis of said actuator,
cleats which each have a peripheral projecting zone,
two opposite and removable cylinder bottoms each axially closing a respective one of the two opposite open end sides of the cylinder and both having external casings configured to receive the cleats, the projecting zone of the cleats being engaged in the grooves of the cylinder, and
a first removable fixing device and a second removable fixing device respectively engaged in the respective two opposite cylinder bottoms through said cleats, wherein removal of at least one of the two opposite cylinder bottoms allows access to the piston in the cylinder.

2. The method according to claim 1, wherein the positioning of the selected rack in the device comprises connecting said selected rack to a rod connected, or to be connected, to the selected actuator.

3. The method according to claim 1, wherein positioning the selected rack comprises:
fixing pins in a plate, on said involute;
mounting the plate provided with said pins on a support relative to which the plate is removable, with the support being connected, or to be connected, to at least one rod connected, or to be connected, to the selected actuator.

4. The method according to claim 1, wherein the relative position of the selected pinion to the selected rack is adapted according to an expected actuating speed of the member.

5. The method according to claim 1, wherein said member is a valve, and the two positions are closed and opened.

6. The method according to claim 1, wherein said selected actuator is a jack.

7. The method according to claim 1, wherein said toothed rotating pinion is an elliptical pinion.

8. A group of actuating devices each actuating device actuating a member operable between two positions, wherein each actuating device of said group of actuating devices comprises:
at least one actuator controlled by a power source; and
a rack positioned in meshing connection with a toothed rotating pinion having teeth which extend on a primitive perimeter or diameter (Dp), and are situated at a plurality of different radii,
wherein the rack extends generally transverse to the axis of rotation of the toothed rotating pinion, on a curve which is the involute of at least a part of the primitive perimeter or diameter of the toothed rotating pinion,
the toothed rotating pinion of each actuating device connects with a sleeve so that one of the pinion or the sleeve transmits a torque to the other of the pinion or the sleeve,
each actuating device is arranged such that connections between the toothed rotating pinion and both the selected rack and the sleeve are separable, so that the angular reference positions of the toothed rotating pinion relative to the selected rack and the sleeve can be adapted according to a predefined variation in the torque required for actuating the member, and
two successive selected racks and two successive toothed rotating pinions in said group of actuating devices have a size ratio between 1.20 and 1.80,
wherein said at least one actuator has an axis and comprises:
a cylinder internally grooved on a periphery and open axially at two opposite end sides,
a piston movable in the cylinder, along said axis of said actuator,
cleats which each have a peripheral projecting zone,
two opposite removable cylinder bottoms each axially closing a respective one of the two opposite end sides of the cylinder and both having external casings configured to receive the cleats, the projecting zone of the cleats being engaged in the grooves of the cylinder, and
a first removable fixing device and a second removable fixing device respectively engaged in the respective two opposite cylinder bottoms through said cleats, wherein removal of at least one of the two opposite cylinder bottoms allows access to the piston in the cylinder.

9. The group of actuating devices according to claim 8, wherein the toothed rotating pinion and the sleeve are connected through at least one pin which is movable between:
a fixing position in which the at least one pin is meshed with the selected pinion and the sleeve, and
a release state in which the at least one pin is disengaged from the toothed rotating pinion and/or the sleeve.

10. The group of actuating devices according to claim 8, wherein the selected rack comprises a series of cylindrical meshing pins positioned on the involute curve of the selected rack, on axes parallel to each other and to the axis of rotation of the toothed rotating pinion.

11. The group of actuating devices according to claim 8, wherein each cylinder bottom is provided with a peripheral seal and has a diameter substantially equal to the internal diameter of the cylinder, in order to be able to slide tightly into the cylinder for the purpose of engagement or disengagement of the cleats.

12. The group of actuating devices according to claim 8, wherein:

one of the cylinder bottoms is provided with a hollow projecting end piece through which a rod of the actuator is connected, or is to be connected, to the rack passes, the projecting end piece provided with a rim, and the rack, the pinion, and the sleeve are received in a casing having an inner groove adapted to receive the rim of the projecting end piece.

13. The group of actuating devices according to claim 8, wherein said member is a valve, and the two positions are closed and opened.

14. The group of actuating devices according to claim 8, wherein said selected actuator is a jack.

15. The group of actuating devices according to claim 8, wherein said toothed rotating pinion is an elliptical pinion.

\* \* \* \* \*